United States Patent
Ho et al.

(10) Patent No.: US 11,055,061 B2
(45) Date of Patent: Jul. 6, 2021

(54) SIGNAL TRANSMISSION METHOD AND A CIRCUIT STRUCTURE FOR HETEROGENEOUS PLATFORMS

(71) Applicant: REALTEK SEMICONDUCTOR CORP., Hsinchu (TW)

(72) Inventors: Sa-Chia Ho, Hsinchu County (TW); Hong-Chang Wu, New Taipei (TW); Hsin-Chen Chen, Kaohsiung (TW); Yi-Hsuan Wu, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 16/597,924

(22) Filed: Oct. 10, 2019

(65) Prior Publication Data
US 2020/0218504 A1    Jul. 9, 2020

(30) Foreign Application Priority Data
Jan. 9, 2019  (TW) .................. 108100858

(51) Int. Cl.
| G06F 5/06 | (2006.01) |
| G06F 9/44 | (2018.01) |
| G06F 3/06 | (2006.01) |
| G06F 9/46 | (2006.01) |
| G06F 13/40 | (2006.01) |
| H04B 1/04 | (2006.01) |

(52) U.S. Cl.
CPC .............. *G06F 5/06* (2013.01); *G06F 3/0601* (2013.01); *G06F 9/44* (2013.01); *G06F 9/46* (2013.01); *G06F 13/4027* (2013.01); *H04B 1/04* (2013.01); *G06F 2003/0692* (2013.01); *G06F 2205/062* (2013.01)

(58) Field of Classification Search
CPC ..................................... G06F 5/06; G06F 9/44
See application file for complete search history.

(56) References Cited

U.S. PATENT DOCUMENTS

| 9,053,777 | B1* | 6/2015 | Crosland .......... G11C 11/40611 |
| 2006/0206651 | A1* | 9/2006 | Wu .................... G06F 13/4027 710/306 |
| 2007/0204143 | A1 | 8/2007 | Liao |
| 2011/0307847 | A1* | 12/2011 | Liao .................... G06F 30/331 716/103 |

FOREIGN PATENT DOCUMENTS

JP    11154967 A    6/1999

* cited by examiner

*Primary Examiner* — Zachary K Huson
(74) *Attorney, Agent, or Firm* — Li & Cai Intellectual Property (USA) Office

(57) ABSTRACT

A signal transmission method and a circuit structure for heterogeneous platforms are provided. The method includes: adjusting signal transmission bandwidths between a first platform and a bridge circuit and between the bridge circuit and a second platform according to signal transmission speeds between the first platform and the bridge circuit and between the bridge circuit and the second platform; transmitting a command signal from the first platform to the bridge circuit and saving the command signal at a buffer of the bridge circuit; reading the command signal at the buffer of the bridge circuit by the second platform; transmitting data to the buffer of the bridge according to the command signal by the second platform; acquiring the data at the buffer of the bridge by the first platform.

19 Claims, 2 Drawing Sheets

SIGNAL TRANSMISSION METHOD AND A CIRCUIT STRUCTURE FOR HETEROGENEOUS PLATFORMS

CROSS-REFERENCE TO RELATED PATENT APPLICATION

This application claims the benefit of priority to Taiwan Patent Application No. 108100858, filed on Jan. 9, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a signal transmission method and a circuit structure for heterogeneous platforms, and more particularly to a signal transmission method and a circuit structure for heterogeneous platforms to synchronize signals in heterogeneous platforms.

BACKGROUND OF THE DISCLOSURE

In design of integrated circuit, the function of the integrated circuit is usually tested on a test machine in advance, and the engineer can choose a semi-customized design approach, e.g., a Field-Programmable Gate Arrays (FPGA) apparatus, a virtual platform or an emulator, to simulate the function of the integrated circuit chip. The so-called semi-customized design is to implement the FPGA apparatus for some components and the virtual platform or the emulator for other components for other components on the integrated circuit. When the test results are good, all components will be integrated and used to perform a manufacture of the integrated circuit. Therefore, the cost of design of the integrated circuit can be stored, and the testing time of the integrated circuit can also be accelerated.

However, although the FPGA apparatus, the virtual platform or the emulator can simulate all the functions of the components of the integrated circuit, the signal transmission speed of the FPGA apparatus, the virtual platform or the emulator may be faster or slower. Therefore, the signal transmission of the integrated circuit is not synchronized.

Therefore, how to overcome the problem of the unsynchronized signal transmission during the design of the integrated circuit to improve the design and test results of the integrated circuit has become one of the important topics to be solved in the current field.

SUMMARY OF THE DISCLOSURE

In response to the above-referenced technical inadequacies, the present disclosure provides a signal transmission method for heterogeneous platforms and a circuit structure for heterogeneous platforms to improve the problem that the signal transmissions in heterogeneous platforms are not synchronized.

In order to solve the aforementioned technical problem, the present disclosure provides a circuit structure for heterogeneous platforms includes a first platform, a bridge circuit and a second platform. The bridge circuit is electrically connected to the first platform. The second platform is electrically connected to the bridge circuit, and a signal transmission speed of the first platform is different from the second platform thereof. The signal transmission bandwidth between the bridge platform and the second platform is adjusted according the signal transmission speed between the first platform and the bridge.

In one aspect, the present disclosure provides a signal transmission method for heterogeneous platforms includes: adjusting signal transmission bandwidths between a first platform and a bridge circuit and between a second platform and the bridge circuit according to signal transmission speeds in the first platform and the second platform; transmitting a command signal from the first platform to the bridge circuit and storing the command signal in a buffer of the bridge circuit; reading the command signal in the buffer of the bridge circuit by the second platform; transmitting data to the buffer of the bridge circuit according to the command signal; and acquiring the data in the buffer of the bridge circuit by the first platform.

In one aspect, the present disclosure provides a circuit structure for heterogeneous platforms includes a master platform, a bridge circuit and a slave platform. The bridge circuit is electrically connected to the master platform. The slave platform is electrically connected to the bridge circuit, and a signal transmission speed of the master platform is different from the slave platform thereof. The signal transmission bandwidth between the bridge platform and the slave platform is adjusted according the signal transmission speed between the master platform and the bridge.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
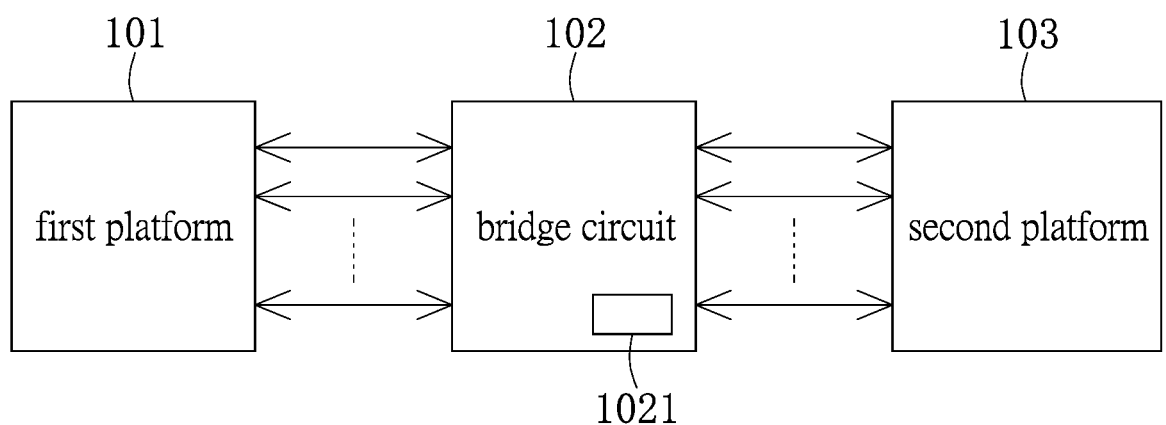
FIG. 1 is a block diagram of a circuit structure for heterogeneous platforms in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

With reference to FIG. 1, FIG. 1 is a block diagram of a circuit structure for heterogeneous platforms in the present disclosure. A circuit structure 10 for heterogeneous platforms provided in the embodiment of the present disclosure includes a first platform 101, a bridge circuit 102 and a second platform 103.

For example, the first platform 101 can be a virtual platform, the second platform 103 can be a field-programmable gate array (FPGA) apparatus, and signal transmission for different components has limitation. However, in a different embodiment, the first platform 101 can also be an FPGA apparatus and the second platform 103 can be the virtual platform, and it is not limited thereto. Since the first platform 101 and the second platform 103 are heterogeneous platforms, the signal transmissions in both platforms are different. In general, when the signal transmission in the first platform 101 is faster than the signal transmission in the second platform 103, the first platform 101 is called a master platform and the second platform 103 is called a slave platform. However, in a different embodiment, the signal transmission in the second platform 103 can be faster than the signal transmission in the first platform 101, and the second platform 103 is called the master platform and the first platform 101 is called the slave platform, but it is not limited thereto.

A bridge circuit 102 is electrically connected to the first platform 101, and the second platform 103 is electrically connected to the bridge circuit 102. Since the signal transmission in the first platform 101 is faster than the signal transmission in the second platform 103, the bridge circuit 102 is used to balance the signal transmission in the first platform 101 and the second platform 103. For example, when the signal transmission speed in the first platform 101 is 10 MHz/s and the signal transmission speed in the second platform 103 is 2 MHz/s, a signal reading or writing error may be occurred in an integrated circuit because the signal transmissions in the first platform 101 and the second platform 103 are different. Therefore, in the present embodiment, a bandwidth between the second platform 103 and the bridge circuit 102 is increased by 5 times, so that the signal transmission between the first platform 101 and the bridge circuit 102 and the signal transmission between the bridge circuit 102 and the second platform 103 will be become the same. In order to increase the bandwidth, the number of signal transmission ports can be increased, and since the person with ordinary skill in the art knows how the number of the signal transmission ports can be increased, the detail description is omitted thereto.

The circuit structure 10 for heterogeneous platforms in the present disclosure can adjust the bandwidth between the first platform 101 and the bridge circuit 102 or the bandwidth between the bridge circuit 102 and the second platform 103 when the signal transmission between the first platform 101 and the bridge circuit 102 is different from the signal transmission between the bridge circuit 102 and the second platform 103. Therefore, the signal transmission between the first platform 101 and the bridge 102 and the signal transmission between the bridge circuit 102 and the second platform 103 will be the same.

Furthermore, the bridge circuit 102 further includes a buffer 1021, which is preferably a first in first out (FIFO) buffer, and the buffer 1021 is capable of storing data transmitted from the first platform 101 or the second platform 103 so as to achieve the purpose of data buffering. For example, when the data reading/writing between the first platform 101 and the second platform 103 is required to perform a handshaking, the command in the first platform 101 or the second platform 103 can be temporarily stored in the buffer 1021 in advance. After the first platform 101 or the second platform 103 acquires the command in the buffer 1021, the second platform 103 or the first platform 101 transmits the corresponding data to the buffer 1021 of the bridge circuit 102 according to the command Finally, the first platform 101 or the second platform 103 acquires the corresponding data in the buffer 1021 of the bridge circuit 102.

By using the circuit structure 10 for heterogeneous platforms in the present disclosure, the problem that the signal transmission speed between the first platform 101 and the second platform 103 can be improved so as to make the test of the integrated circuit more accuracy.

Figure 2:
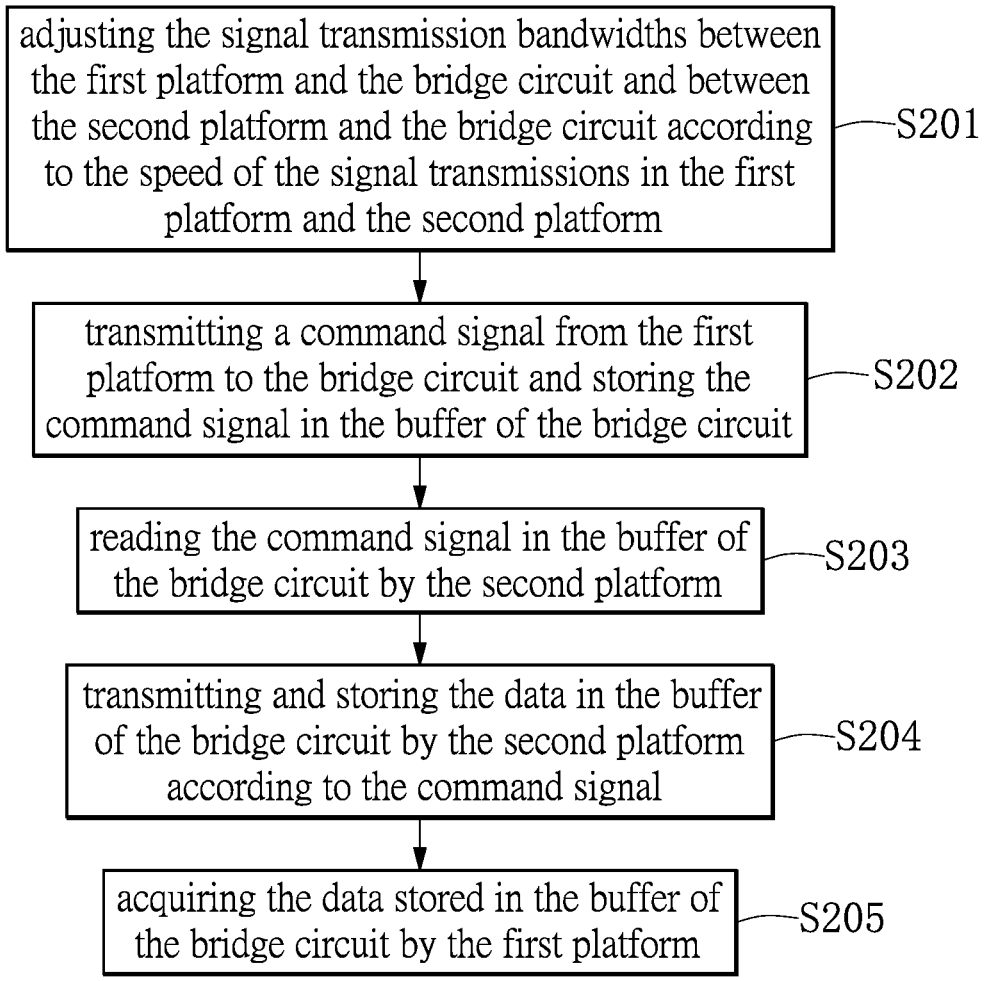
FIG. 2 is a flow chart of a signal transmission method for heterogeneous platforms in the present disclosure.

With reference to FIG. 2, FIG. 2 is a flow chart of a signal transmission method for heterogeneous platforms in the present disclosure. The signal transmission method for heterogeneous platforms in the present disclosure implements the aforementioned circuit structure to achieve the purpose that the signal transmissions are the same. The signal transmission method includes the following steps. In step S201, according to the speed of the signal transmissions in the first platform and the second platform, the signal transmission bandwidths between the first platform and the bridge circuit and between the second platform and the bridge circuit are adjusted. When the speed of the signal transmission in the first platform is faster than the speed of the signal transmission in the second platform, the signal transmission bandwidth between the bridge circuit and the second platform is adjusted so as to symphonize the signal transmission between the first platform and the bridge circuit and the signal transmission between the bridge circuit and the second platform. Therefore, the synchronizing problem of the signal transmission in the integrated circuit caused by the differences of the signal transmissions in the first platform and the second platform can be improved.

In step S202, a command signal is transmitted from the first platform to the bridge circuit and the command signal is temporarily stored in the buffer of the bridge circuit. In the data transmission, when the first platform transmits the command signal to the bridge circuit and the command signal will be temporarily stored in the buffer of the bridge circuit. During the signal transmission, the sequence of the data reading or writing is required to be considered. For example, when the data is required to perform a handshaking, the signal can be temporarily stored in the buffer of the bridge circuit to wait the data transmitted from the second platform to the bridge circuit.

In step S203, the second platform reads the command signal in the buffer of the bridge circuit. In step S204, the second platform transmits the data to temporarily store in the buffer of the bridge circuit according to the command signal. Then, in step S205, the first platform receives the data stored in the buffer of the bridge circuit. After the second platform reads the command signal in the buffer of the bridge, the second platform determines which data is needed by the first platform. Therefore, the second platform transmits the corresponding data to the buffer of the bridge circuit to complete the signal transmission method for heterogeneous platforms in the present disclosure.

Through the bridge circuit, the problem that the speed of the signal transmission between the first platform and the bridge circuit is different from the speed of the signal transmission between the bridge circuit and the second platform can be improved, and the data reading/writing problem in the data reading/writing requirement can also be improved.

One of the advantages to provide a signal transmission method and a circuit structure for heterogeneous platforms in the present disclosure is to adjust the signal transmission bandwidth between the first platform and the bridge circuit and between the bridge circuit and the second platform and dispose a buffer in the bridge circuit to improve the problem of the unsynchronized signal transmission because of the heterogeneous platforms.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A circuit structure for heterogeneous platforms, comprising:
    a first platform;
    a bridge circuit electrically connected to the first platform; and
    a second platform electrically connected to the bridge circuit, and a signal transmission speed of the first platform being different from the second platform thereof;
    wherein a signal transmission bandwidth between the bridge circuit and the second platform is adjusted according to the signal transmission speed between the first platform and the bridge circuit to make the signal transmission speed between the bridge and the second platform being equal to the signal transmission speed between the first platform and the bridge circuit.

2. The circuit structure for heterogeneous platforms according to claim 1, wherein the bridge circuit further includes a buffer and the buffer is configured to store data transmitted from the first platform and the second platform.

3. The circuit structure for heterogeneous platforms according to claim 2, wherein the buffer is a first in, first out (FIFO) buffer.

4. The circuit structure for heterogeneous platforms according to claim 2, wherein the data transmitted from the first platform is stored in the buffer, and the data is read by the second platform from the buffer.

5. The circuit structure for heterogeneous platforms according to claim 1, wherein the first platform or the second platform is a field-programmable gate array (FPGA) apparatus.

6. The circuit structure for heterogeneous platforms according to claim 1, wherein the first platform or the second platform is a virtual platform.

7. The circuit structure for heterogeneous platforms according to claim 1, wherein the first platform and the second platform are different platforms.

8. The circuit structure for heterogeneous platforms according to claim 1, wherein the first platform transmits a command signal to the bridge circuit and the command signal is temporarily stored in the buffer of the bridge circuit.

9. The circuit structure for heterogeneous platforms according to claim 8, wherein the second platform reads the command signal in the buffer of the bridge circuit and transmits the data to store in the buffer of the bridge circuit according to the command signal, and the first platform acquires the data temporarily stored in the buffer of the bridge circuit.

10. A signal transmission method for heterogeneous platforms, comprising:
    adjusting signal transmission bandwidths between a first platform and a bridge circuit and between a second platform and the bridge circuit according to signal transmission speeds in the first platform and the second platform so as to synchronize the signal transmission speeds between the first platform and the bridge circuit and between the bridge circuit and the second platform;
    transmitting a command signal from the first platform to the bridge circuit and storing the command signal in a buffer of the bridge circuit;
    reading the command signal in the buffer of the bridge circuit by the second platform;
    transmitting data to the buffer of the bridge circuit according to the command signal; and
    acquiring the data in the buffer of the bridge circuit by the first platform.

11. The signal transmission method for heterogeneous platforms according to claim 10, wherein the buffer is a first in, first out (FIFO) buffer.

12. The signal transmission method for heterogeneous platforms according to claim 10, wherein the first platform or the second platform is a field-programmable gate array (FPGA) apparatus.

13. The signal transmission method for heterogeneous platforms according to claim 10, wherein the first platform or the second platform is a virtual platform.

14. A circuit structure for heterogeneous platforms, comprising:
    a master platform;
    a bridge circuit electrically connected to the master platform; and
    a slave platform electrically connected to the bridge circuit, and a signal transmission speed of the master platform being different from the slave platform thereof;
    wherein a signal transmission bandwidth between the bridge circuit and the slave platform is adjusted according the signal transmission speed between the master platform and the bridge circuit to make the signal transmission speed between the slave platform and the bridge circuit being equal to the signal transmission speed between the master platform and the bridge circuit.

15. The circuit structure for heterogeneous platforms according to claim 14, wherein the bridge circuit further includes a buffer and the buffer is configured to store data transmitted from the master platform and the slave platform.

16. The circuit structure for heterogeneous platforms according to claim 15, wherein the buffer is a first in first out buffer.

17. The circuit structure for heterogeneous platforms according to claim 15, wherein the data transmitted from the master platform is stored in the buffer, and the data is read by the slave platform from the buffer.

18. The circuit structure for heterogeneous platforms according to claim 14, wherein the master platform or the slave platform is a field-programmable gate array (FPGA) apparatus.

19. The circuit structure for heterogeneous platforms according to claim 14, wherein the master platform or the slave platform is an emulator.

* * * * *